UNITED STATES PATENT OFFICE.

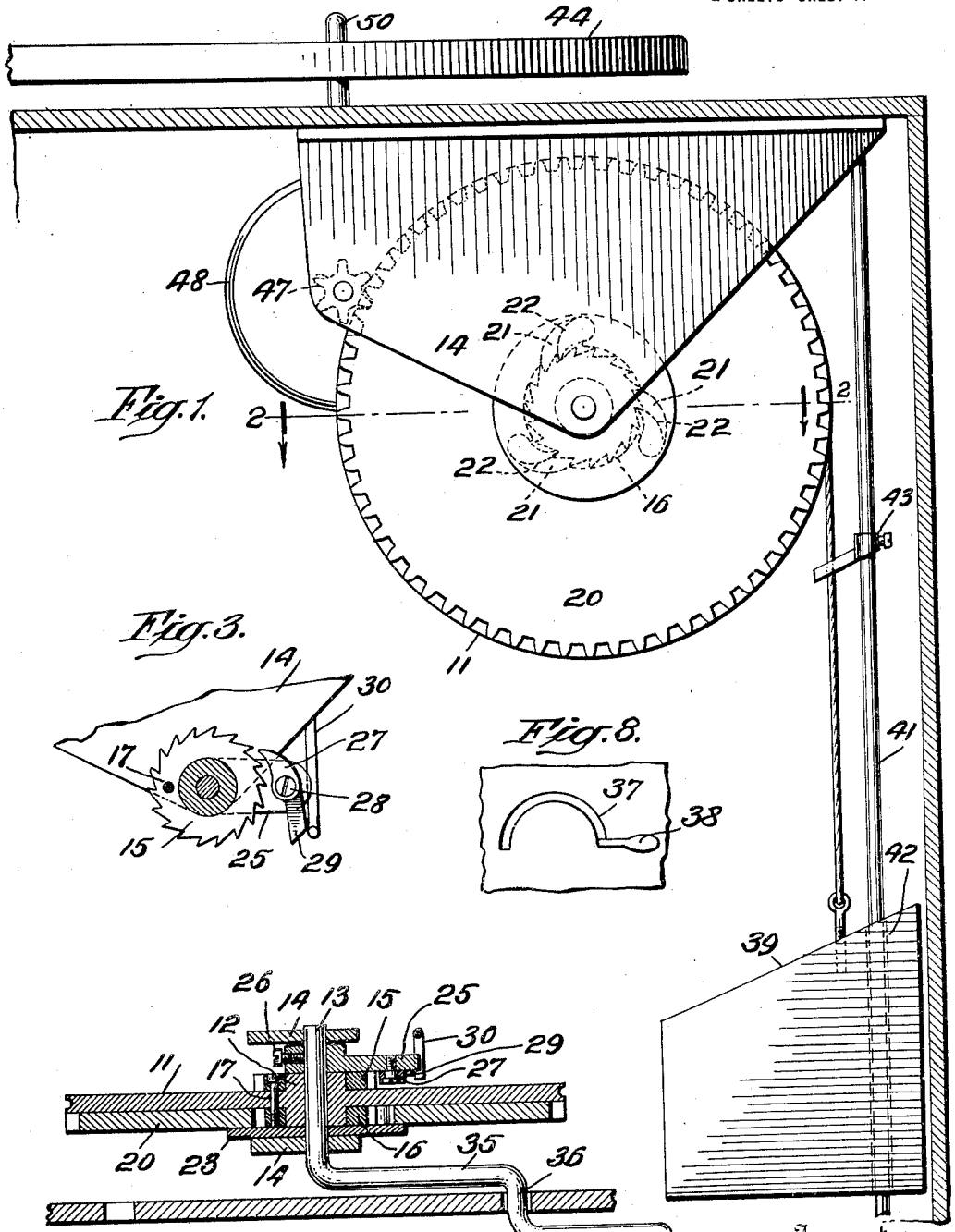

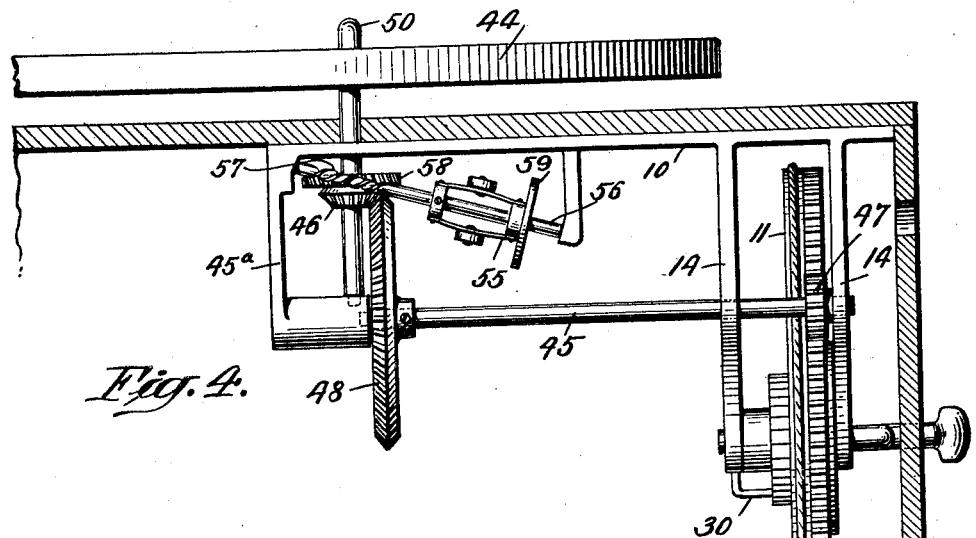
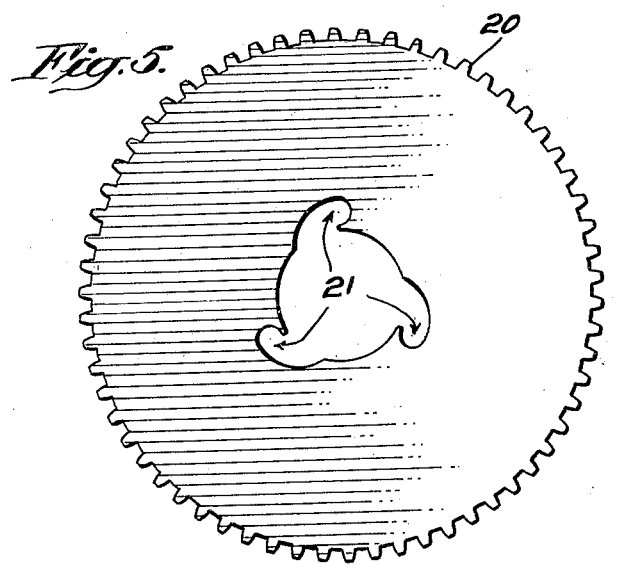
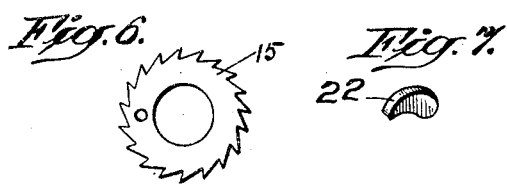
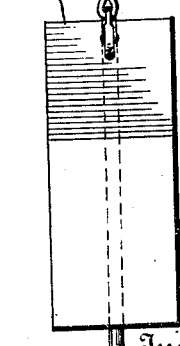

FRANK C. DOHRMANN, OF NEW YORK, N. Y., ASSIGNOR TO CHARLES A. CARNES, OF NEW YORK, N. Y.

PHONOGRAPH-MOTOR.

1,358,426.   Specification of Letters Patent.   Patented Nov. 9, 1920.

Application filed May 12, 1920. Serial No. 380,823.

*To all whom it may concern:*

Be it known that I, FRANK C. DOHRMANN, a citizen of the United States, residing at New York city, in the county of Kings and State of New York, have invented certain new and useful Improvements in Phonograph-Motors, fully described and represented in the following specification and the accompanying drawings, forming a part of the same.

This invention relates to phonograph motors and has for an object to provide a motor which may be rewound quickly.

A further object of my invention is to provide a motor of great simplicity which may easily be constructed and is not likely to get out of order.

Phonograph motors heretofore used have been wound by means of turning a crank projecting on the outside of the cabinet. These motors are usually spring driven and require many turns of the crank to wind them up. The spring provided is usually of sufficient length to play several records after a single complete winding, but as the motor runs down the driving force of the spring decreases, resulting in a slowing down of the motor and a consequent flatting of the notes. In order to reproduce tones properly, therefore, such phonograph motors must be kept continually tightly wound. There is, however, nothing on the phonograph to indicate how tightly wound the spring is when a record is placed upon the phonograph. Furthermore, the force necessary to wind up the spring varies constantly, increasing as the spring tightens, so that the person winding up the motor cannot, unless much more expert than the majority of phonograph users, tell exactly when the motor is completely wound up.

The varying force which must be applied in winding a spring motor and the danger of breaking the spring if the motor is wound a little too tightly, has made it impracticable to supply such motors with a quick acting means for rewinding.

By my invention I have provided a motor which may be wound by a single movement in one direction of a handle projecting through the slot in the wall of the cabinet. One such winding is sufficient to enable the phonograph to play one record, and during the playing of the record a uniform driving force is at all times exerted by the motor. The winding is performed so quickly that it may easily be done each time that a record is placed upon the phonograph, and there is, therefore, no possibility that the motor may slow down or stop during the playing of a record, as frequently happens in the use of ordinary phonograph motors. When the device is used for playing short records, it may not be necessary to wind the motor after each record. The extent to which the motor has run down in playing a record may be quickly observed by the position of the handle in the slot after playing the record, so that the operator may determine at a glance whether or not it is necessary to rewind or not before playing another record.

I have accomplished this result by combining with a quick acting means for rewinding, a weight to drive the motor in place of the spring customarily used. By this means I have provided a motor which, besides producing a constant driving force for the phonograph record, presents a constant resistance to the handle in rewinding. I have found that a weight of approximately 20 pounds having a vertical travel of the length of an ordinary phonograph cabinet supplies sufficient power to play the longest records. I have combined with a weight-driven motor a quick acting means for rewinding which may be operated by a single movement against a uniform resistance. A stop is provided to limit the upward movement of the weight which serves also to limit the movement of the rewinding handle and thus to indicate to the person operating the handle the exact point at which the motor is completely wound up, as it is merely necessary to move the handle against a constant resistance until the handle is abruptly arrested. The mechanism which I have invented, therefore, not only provides for quick winding, but also obviates the danger of incomplete winding or of breaking the mechanism which is present in rewinding ordinary phonograph motors where the operator must judge for himself the exact point in an increasing resistance which indicates the proper degree of winding.

In order that my invention may clearly be understood, I will describe in detail the specific embodiment of it shown in the accompanying drawings, in which—

Figure 1 is a right side elevation of the motor and the turn-table of the phonograph showing part of the phonograph cabinet in section;

Fig. 2 is a horizontal section taken on the line 2—2 of Fig. 1;

Fig. 3 is a fragmentary left side elevation showing the winding ratchet and trip;

Fig. 4 is a front elevation of the motor showing part of the phonograph cabinet in section;

Fig. 5 is a detail of the driving gear;

Fig. 6 is a detail of one of the ratchet wheels;

Fig. 7 is a perspective view of one of the pawls; and

Fig. 8 is a right side elevation of the outside of the cabinet showing the handle and the slot through which it projects.

In the form shown in the drawings, the motor is supported by a frame 10 which may be made of a single casting and which is attached to the under side of the top of the cabinet. The motor wheel 11 has an enlarged hub portion 12 rotatably mounted upon a shaft 13 which is journaled in two downwardly projecting elements 14 of the frame 10. Two ratchet wheels 15 and 16 are mounted upon the projecting ends of the hub 12 and rigidly attached to the motor wheel 11 by means of a screw 17 passing through the ratchet wheel 15 and the motor wheel 11, and screwed into the ratchet wheel 16. Upon the outer periphery of the teeth of the ratchet wheel 16 is mounted the driving gear 20. The inner edge of the gear 20 is provided with a plurality of sockets 21 in which are seated pawls 22. These pawls are retained in the sockets 21 by the motor wheel 11 on one side, and on the other side by a plate 23 loosely mounted upon the shaft 13 between the driving gear 20 and the frame.

An arm 25 is rigidly attached to the shaft 13 by means of a set screw 26. On the arm 25 a pawl 27 is mounted by means of a screw 28. This pawl has a rearward extension 29 which serves to trip the pawl and move it out of contact with the ratchet wheel 15 when the extension 29 comes in contact with a depending rod 30 attached to one of the depending elements 14 of the frame 10.

The outer end of the shaft 13 extends radially in the form of a crank 35 which lies close to the inside of the wall of the cabinet. At the end of the crank 35 is an offset portion 36 which passes through a semi-circular slot 37 in the wall of the cabinet. The handle 38 forms a continuation of the offset portion 36 and extends parallel to the wall of the cabinet on the outside thereof.

The means provided for driving the wheel 11 consists of a weight 39 attached to a band 40 passing over the wheel 11 and having its end attached thereto. The weight is guided by a vertical rod 41 rigidly attached within the cabinet and passing through a vertical hole 42 in the weight 39. The band 40 is attached to the weight 39 at a point which is directly over the center of gravity of the weight when the hole 42 is vertical, so that the weight hangs so as not to bind upon the rod 41. A stop 43 limits the upward movement of the weight 39. The downward movement of the weight is limited by the bottom of the cabinet. The entire travel of the weight is equal to one-half the circumference of the wheel 11, so that this wheel makes a half turn over each complete descent of the weight.

Connecting mechanism is provided for transferring the motion of the driving gear 20 to the turn-table 44 of the phonograph. It comprises a horizontal shaft 45 journaled in the depending elements 14 and the depending bracket 45ª, all of which form part of the frame 10. Upon the shaft 45 is mounted a small pinion 47 meshing with the driving gear 20, and a large beveled gear 48 meshing with a small beveled gear 49 upon the shaft 50 of the turn-table 44. The relative sizes of the gears are such that a half turn of the driving gear 20 revolves the turn-table 44 a sufficient number of times to play a phonograph record of the largest size commonly used.

A governor 55 is mounted upon a shaft 56 placed at an angle to the top of the casing and supported by the frame 10. The shaft 56 bears a worm 57 which meshes with a gear 58 placed on the shaft 50 above the beveled gear 49. An adjustable friction brake such as is commonly used in connection with phonograph governors may be placed so that the disk 59 of the governor 55 will contact with it when the speed of the turn-table exceeds a predetermined rate.

The operation of the device described is as follows:—Assuming that a record has been placed upon the turn-table and that the weight 39 is at the upper end of its travel in contact with the stop 43 and that the brake or other means used to prevent rotation of the turn-table during the placing of a record upon it is released, the weight 39 will descend along the rod 41, turning the wheel 11 and the two ratchet wheels 15, 16 attached thereto in a clockwise direction (Fig. 1). The one or more of the pawls 22 which are above the center of the gear wheel 20 engage the teeth of the ratchet 16, so that the driving gear 20 will be caused to rotate in a clockwise direction, driving the turn-table 44 through the connecting gearing. If during the descent of the weight the handle 38 is in the back end of the slot 37, as shown in the drawings, the arm 25 will be in the position shown in Fig. 3, and the pawl 27 will be held out of engagement with the ratchet 15 by the contact of its rear portion 29 with the rod 30. If, however, the handle 38 is in any other position in the slot 37, the pawl 27 will engage the teeth of the ratchet 15, resulting in moving the handle 38 backwardly in the slot 37 during the descent of the weight.

When the playing of a record is completed, the turn-table is stopped in the usual manner. Before playing the next record the motor may be wound by simply throwing the handle 38 forward in the slot 37. By this movement, the arm 25 is turned in an anti-clockwise direction and the pawl 27 engaging the ratchet 15 turns this ratchet and the wheel 11 in an anti-clockwise direction, drawing the weight 39 upwardly until it engages the stop 43. The anti-clockwise movement given the ratchet wheel 16 in winding up the weight is not transferred to the driving gear 20 as the pawls 22 slip over the teeth of the ratchet 16 during this movement. When the winding is completed and the pull on the handle 38 released, one or more of the pawls 22 engage the ratchet 16, preventing the weight from descending until the turn-table is released.

If the weight 39 has made its complete travel during the playing of a record, the handle 38 must be moved from the back end of the slot 37 to the front end to effect a complete winding of the machine. Winding in this way takes but a moment and the force sufficient to raise the weight may easily be applied as the motion of the handle is in one direction only. If desired, the handle may be returned to the back end of the slot 37 after it has been moved to the front to wind up the weight, and in that case it will remain in the back end of the slot during the playing of the next record. In the movement of the handle to the back the arm 25 is given a clockwise movement, so that the pawl 27 slips over the teeth of the ratchet 15 without turning the wheel 11.

If, however, the handle is left at the front end of the slot after winding, it will travel to the right in the slot 37 as the weight descends, so that its position in the slot will indicate the extent to which the motor is run down. Thus, if so short a record is played that the handle has not reached the middle of the slot at the end of the record, it can be at once observed that rewinding before playing a record of the same length is unnecessary.

Many modifications may be made in the apparatus described without departing from my invention. Thus the length and form of the slot 37 through which the handle projects may be varied, or, if desired, the slot may be done away with, and the handle crank placed outside the wall of the cabinet. Furthermore, the handle may, if desired, be arranged so as to be operated by the foot.

What is claimed is:

1. A motor for phonographs, comprising a wheel, a weight supported by a band passing over said wheel and having a travel less than the periphery of said wheel, connecting mechanism between said wheel and the turn-table of the phonograph adapted to turn said turn-table a sufficient number of times to play a phonograph record while the wheel makes less than a complete revolution, and a handle for rewinding the motor directly connected to the wheel.

2. A motor for phonographs, comprising a shaft within the phonograph cabinet, a handle attached to said shaft, a motor wheel rotatably mounted upon said shaft, means for driving said motor wheel, two ratchet wheels concentric with said motor wheel and attached thereto, a driving gear concentric with said motor wheel and bearing pawls adapted to engage one of said ratchets, connecting mechanism between said gear and the turn-table of the phonograph, an arm rigidly connected to said shaft and bearing a pawl adapted to engage the other of said ratchet wheels, and a stop adapted to prevent said pawl from engaging said ratchet when the handle is in one position.

3. A motor for phonographs, comprising a shaft within the phonograph cabinet, a handle attached to said shaft and projecting through a slot in the wall of the cabinet, a motor wheel rotatably mounted upon said shaft, means for driving said motor wheel, two ratchet wheels concentric with said motor wheel and attached thereto, a driving gear concentric with said motor wheel and bearing pawls adapted to engage one of said ratchets, connecting mechanism between said gear and the turn-table of the phonograph, an arm rigidly connected to said shaft and bearing a pawl adapted to engage the other of said ratchet wheels, and a stop adapted to prevent said pawl from engaging said ratchet when the handle is in one end of the slot.

4. In a motor for phonographs, a motor wheel, means for driving said wheel, a concentric ratchet wheel attached to said motor wheel, a concentric gear mounted upon the teeth of said ratchet and having sockets in its inner edge, pawls in said sockets adapted to engage the teeth of said ratchet wheel when said wheel is turned in one direction, and means for preventing lateral movement of said pawls in said sockets.

5. A motor for phonographs comprising a motor wheel, a weight for driving said motor wheel, a driving gear having a ratchet connection with said motor wheel, connecting mechanism between said driving gear and the turntable of the phonograph, a handle having direct ratchet connection with said motor wheel and adapted to rewind the motor by a single movement in one direction, and automatic means for disconnecting the handle from the motor wheel when the handle is moved to its extreme position in the other direction.

6. In a phonograph having a cabinet, a weight-driven motor within the cabinet, a connection between said motor and the turntable of the phonograph, a handle connected with said motor projecting through a slot in the wall of the cabinet and adapted to rewind said motor by a single movement toward one end of said slot, and automatic means for disconnecting said handle from said motor when said handle is at the other end of said slot.

7. A motor for phonographs comprising a motor wheel, a weight for driving said motor wheel, a driving gear having a ratchet connection with said motor wheel, connecting mechanism between said driving gear and the turntable of the phonograph, a handle for rewinding said motor wheel, a ratchet and pawl connecting said handle and said motor wheel, and automatic means for holding said pawl out of connection with said ratchet when the handle is in a predetermined position.

8. A motor for phonographs comprising a shaft within the phonograph cabinet, a handle attached to said shaft, a motor wheel rotatably mounted upon said shaft, means for driving said motor wheel, connecting mechanism between said motor wheel and the turntable of the phonograph, a pawl and ratchet adapted to transfer turning movement of said shaft in one direction to said motor wheel, and a stop adapted to prevent said pawl from engaging said ratchet when the handle is in one position.

9. In a phonograph having a cabinet, a weight-driven motor within the cabinet, a connection between said motor and the turntable and the phonograph, a crank within the cabinet and pivoted on an axis perpendicular to a wall of the cabinet, a handle attached to the crank and projecting through a slot in said wall and adapted to rewind said motor by a single movement in one direction.

10. In a phonograph having a cabinet, a motor wheel within the cabinet, a crank on which said motor wheel is mounted perpendicular to a wall of the cabinet, a weight for driving said motor wheel, a connection between said motor wheel and the turntable and the phonograph, a crank on said motor wheel shaft lying within the cabinet, and a handle on said crank projecting through a slot in said wall and adapted to rewind the motor by a single movement in one direction.

In testimony whereof I have hereunto set my hand in the presence of two subscribing witnesses.

FRANK C. DOHRMANN.

Witnesses:
PETER J. MALLON,
LENA E. SMITH.